C. CLAPP.
Scythe Fastening.
No. 13,697.
Patented Oct. 23, 1855.
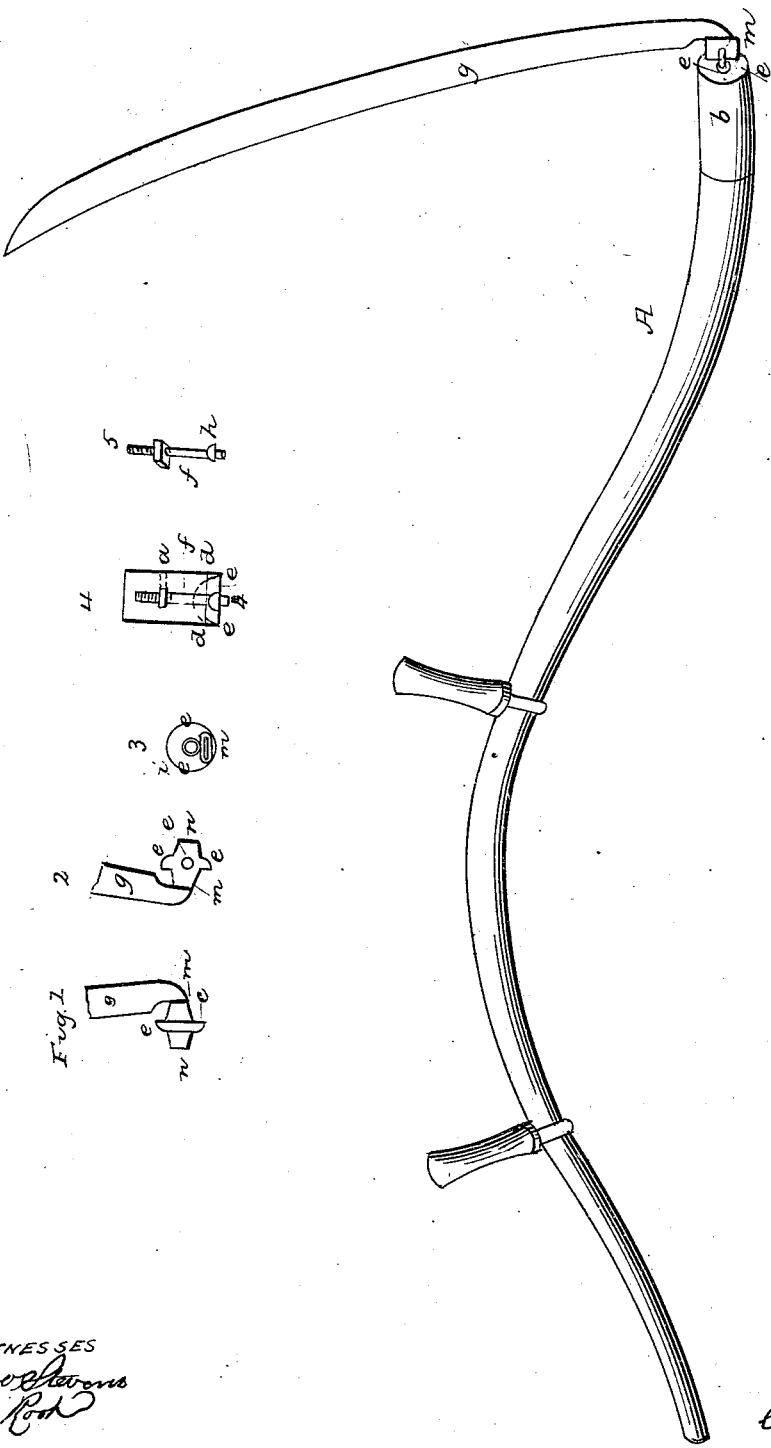

UNITED STATES PATENT OFFICE.

CYRUS CLAPP, OF MONTAGUE, MASSACHUSETTS.

IMPROVEMENT IN SCYTHE-FASTENINGS.

Specification forming part of Letters Patent No. 13,697, dated October 23, 1855.

*To all whom it may concern:*

Be it known that I, CYRUS CLAPP, of Montague, in the county of Franklin and State of Massachusetts, have invented a new and useful Improvement in Fastening Scythes to Snaths, of which the following is a full and exact description.

The objects of the whole arrangement are to enable the mower to adjust the scythe in any desirable position and to render the snath substantial and durable, the letters and figures having reference to the accompanying drawings.

To the large end of the snath A, in the accompanying drawings, is fitted an iron ring or ferrule, *b*, Figure A, of sufficient length to be fixed firmly to the snath A by rivet or otherwise, said ferrule projecting beyond the snath about one-fourth its diameter. The inside of the projecting part of the ferrule, together with the end of the snath, is made cup-shaped, forming a socket, as shown at *d d*, Fig. 4, said cup or hollow serving as a socket to receive a section of a ball, *e e*, Fig. 1. Into this socket is fitted the largest section of a hemispheric ball, *e e*, Fig. 4, made of iron, the length of said section being about one-fourth its diameter, or as long as the ferrule projects beyond the snath. The ball is fastened into the socket by a round iron bolt, *f*, Fig. 4, through its center, said bolt screwing into a nut which is inserted from one side to the center of the snath, as shown at *a*, Fig. 4. The outer portion of the bolt-head is made square, so as to be turned with a wrench, and the inner portion is made round or spherical, as shown at *h*, Fig. 5. The hole *i*, Fig. 3, in the center of the ball, is made somewhat larger than the bolt and countersunk to correspond with the shape of the bolt-head, so that when the bolt is put in loosely the ball will rotate a number of degrees in any direction, and is made fast in any desirable position by screwing up the bolt. Below the bolt-hole in the ball is a mortise or socket to receive the shank of the scythe, as shown at *m*, Fig. 3, said socket projecting outward about half the diameter of the ball and inward somewhat less, as shown at *m* and *n*, Fig. 1. The shank of the scythe is fastened into the socket by being fitted and driven firmly in and a screw on the under side of the ball, as shown at *c*, Fig. 2. Said screw is turned in even with the outside of the ball, and enters a small indentation in the shank of the scythe.

What I claim as my invention is—

The fastening of scythes to snaths by means of the concave socket *d d*, Fig. 4, and section of a ball, *e e*, Fig. 1, to which the scythe *g* is attached, and the center bolt, *f*, as described, the whole being arranged substantially as and for the purposes specified.

In witness whereof I have hereunto subscribed my name this 3d day of October, 1855.

CYRUS CLAPP.

In presence of—
G. A. CLAPP,
WARREN BARDWELL.